US008614897B2

(12) United States Patent
Tang

(10) Patent No.: US 8,614,897 B2
(45) Date of Patent: Dec. 24, 2013

(54) CHIP CARD HOLDING MECHANISM AND PORTABLE ELECTRONIC DEVICE USING THE SAME

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 91 days.

(21) Appl. No.: 13/447,429

(22) Filed: Apr. 16, 2012

(65) Prior Publication Data

US 2013/0044438 A1 Feb. 21, 2013

(30) Foreign Application Priority Data

Aug. 19, 2011 (CN) .......................... 2011 1 0239217

(51) Int. Cl.
*H05K 5/00* (2006.01)

(52) U.S. Cl.
USPC ........... 361/754; 361/752; 361/759; 361/769; 361/787; 361/798

(58) Field of Classification Search
USPC ......... 361/737, 748, 752, 754, 759, 769, 787, 361/798, 801, 807, 825, 829, 361/679.31–679.32, 679.38–679.39, 727
See application file for complete search history.

(56) References Cited

U.S. PATENT DOCUMENTS

| 6,991,480 B2* | 1/2006 | Katayanagi et al. .......... 439/159 |
| 7,066,748 B2* | 6/2006 | Bricaud et al. ................ 439/159 |
| 7,081,020 B1* | 7/2006 | Lee ................................ 439/630 |
| 8,270,175 B2* | 9/2012 | Duan et al. .................... 361/737 |
| 8,371,878 B2* | 2/2013 | Tang ............................. 439/630 |
| 2004/0092149 A1* | 5/2004 | Scuteri et al. ................. 439/326 |
| 2011/0255252 A1* | 10/2011 | Sloey et al. .................... 361/752 |

* cited by examiner

*Primary Examiner* — Jayprakash N. Gandhi
*Assistant Examiner* — Hung Dang
(74) *Attorney, Agent, or Firm* — Altis Law Group, Inc.

(57) ABSTRACT

A chip card holding mechanism includes a bracket, an unlock assembly and a tray. The bracket defines a receiving chamber. The unlock assembly is assembled adjacent to the opening of the bracket. The movable tray is assembled to and received within the receiving chamber of the bracket via the unlock assembly, for receiving a chip card. The unlock assembly includes an ejecting member and an unlock member, the ejecting member is slidably assembled to the opening of the bracket and pushes against the tray. The unlock member is an included accessory for driving the ejecting member to slide, thereby ejecting the tray. An electronic device using the chip card holding mechanism is also provided.

14 Claims, 7 Drawing Sheets

CHIP CARD HOLDING MECHANISM AND PORTABLE ELECTRONIC DEVICE USING THE SAME

BACKGROUND

1. Technical Field

The present disclosure generally relates to holding mechanisms, and particularly to a chip card holding mechanism and an electronic device using the chip card holding mechanism.

2. Description of Related Art

Chip card holding mechanisms are applied to electronic devices for holding chip cards that are assembled within the electronic devices. However, existing chip card holding mechanisms may be wholly assembled within the electronic device and positioned under a battery and/or a back cover of the electronic device. Therefore, when detaching or installing the chip card, the back cover and/or the battery of the electronic device must be first removed. In addition, the chip card holding mechanism has a complicated structure and is difficult to use.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
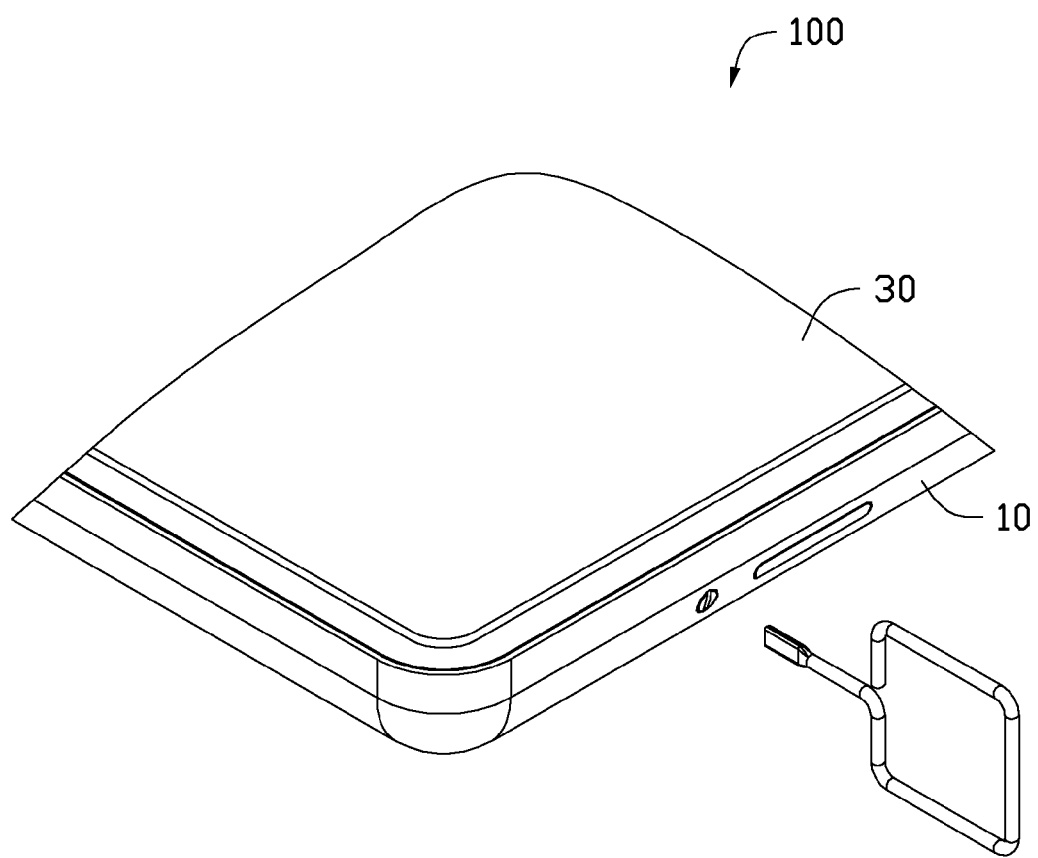
FIG. 1 shows a partial, isometric view of an embodiment of an electronic device.

Referring to FIG. 1, an embodiment of an electronic device 100 is shown. The electronic device 100 can be a tablet computer, a mobile phone, or a camera, or the like. In the illustrated embodiment, the electronic device 100 is a tablet computer. Also referring to FIG. 2, the electronic device 100 includes a housing 10, a display 30 mounted to the housing 10, and a chip card holding mechanism 50 assembled within the housing 10. The chip card holding mechanism 50 is configured for holding a chip card, such as a SD card, a multimedia card, a SIM card and the like.

The housing 10 is a substantially rectangular frame, and includes a base wall 11 and a rectangular peripheral wall 13 perpendicularly extending from a periphery of the base wall 11. The peripheral wall 13 defines an unlock hole 131 through one side wall (not labeled) of the peripheral wall 13, and a card insert slot 133 adjacent to the unlock hole 131. A mounting base 15 is formed on the base wall 11 and positioned adjacent to the unlock hole 131 and the card insert slot 133. The mounting base 15 defines a sliding slot 153 positioned adjacent to, and parallel to, the card insert slot 133. A mounting slot 151 is recessed from the mounting base 15 to communicate with the unlock hole 131 and perpendicularly intersects with the sliding slot 153.

The chip card holding mechanism 50 is mounted on the mounting base 15 and received within the housing 10, for receiving and holding a chip card inserted through the card insert slot 133. The chip card holding mechanism 50 includes a bracket 60, a tray 70 and an unlock assembly 90. The tray 70 is detachably assembled to the bracket 60 via the unlock assembly 90 and is capable of passing through the card insert slot 133 of the housing 10.

Figure 3:
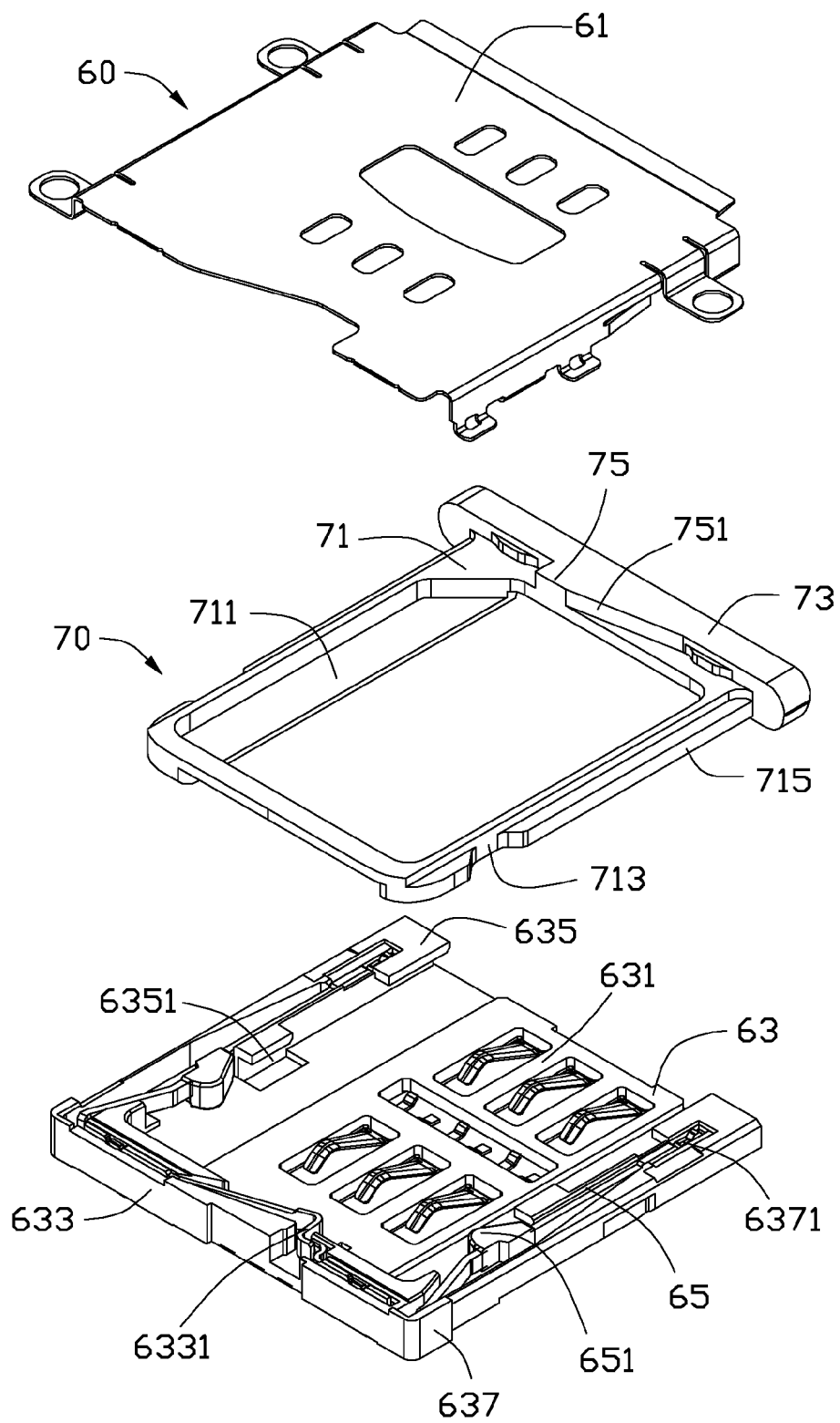
FIG. 3 shows an exploded isometric view of a bracket and a tray of the chip card holding mechanism of FIG. 2.
Figure 4:
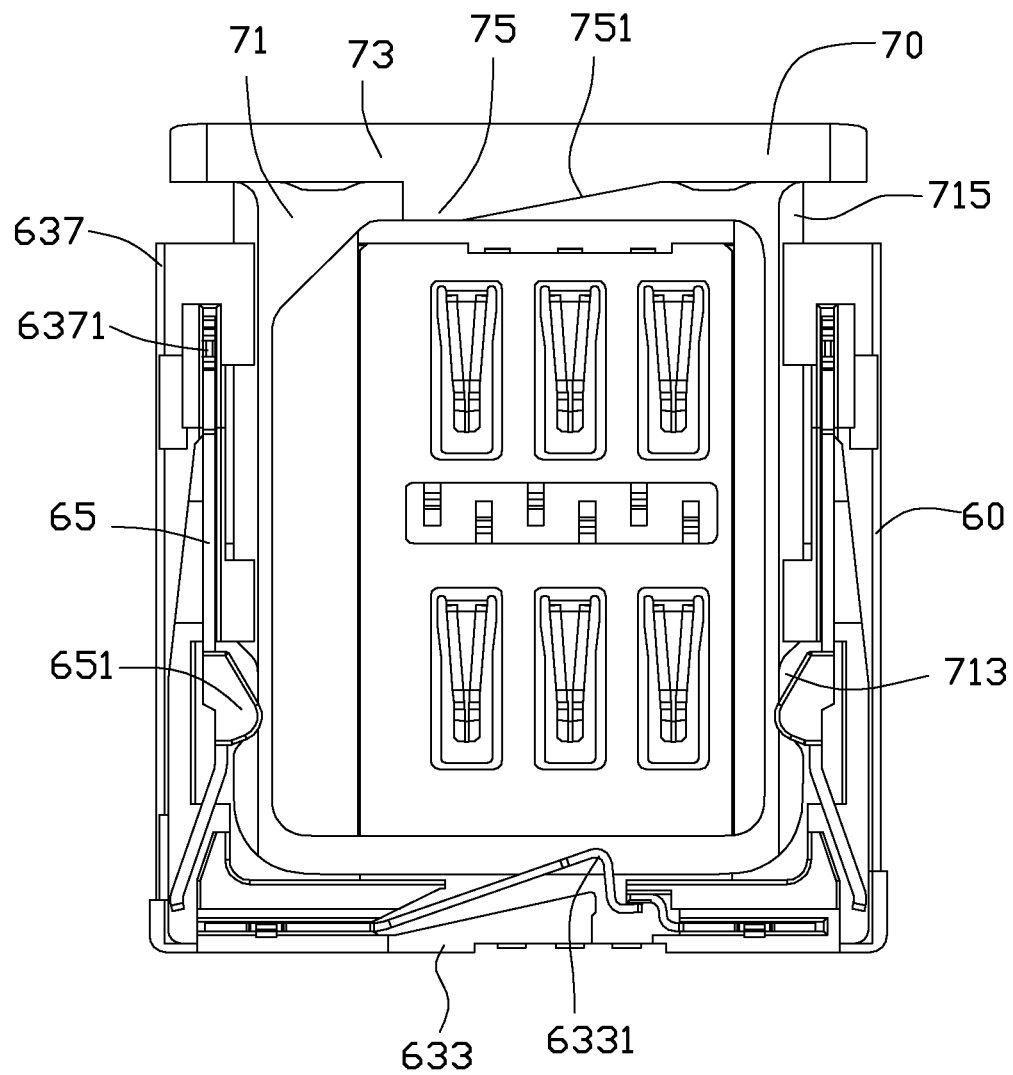
FIG. 4 shows an assembled isometric view of the bracket and the tray of FIG. 3.

Also referring to FIGS. 3 and 4, the bracket 60 is fixedly mounted on the mounting base 15 of the housing 10, and includes an upper cover 61, a bottom cover 63 and two elastic members 65. The upper cover 61 is mounted over the bottom cover 63 and a receiving chamber 613 is cooperatively defined thereby. The receiving chamber 613 has a substantially rectangular opening 611 aligning with the corresponding card insert slot 133. In use, the chip card is placed on the tray 70 and inserted into the card insert slot 133 and received within the receiving chamber 613.

The bottom cover 63 includes a main body 631, a resisting portion 633, two guiding portions 635, and two block portions 637. The main body 631 is a substantially rectangular board for supporting the tray 70. The resisting portion 633 is formed on one end of the main body 631 and positioned opposite to and away from the card insert slot 133. The two guiding portions 635 are disposed opposite each other adjacent to two sides of the main body 631. Each guiding portion 635 defines a guiding slot 6351 toward a middle portion of the main body 631. The main body 631, the resisting portion 633, the two guiding portions 635 and the upper cover 61 cooperative define the receiving chamber 613. A bent elastic sheet 6331 is mounted to the resisting portion 633 and received within the receiving chamber 613, for elastically resisting a distal end of the tray 70. The two block portions 637 are oppositely formed on two sides of the main body 631 and positioned adjacent to the two guiding portions 635 respectively. Each block portion 637 defines a block slot 6371 for assembling one elastic member 65.

The two elastic members 65 are assembled into the two block slots 6371 of the two block portions 637, and partially received within the receiving chamber 613, for elastically resisting two sides of the tray 70. In the illustrated embodiment, the elastic member 65 is a bent elastic sheet, and includes an elastic protrusion 651 formed on a substantially middle portion of the elastic member 65, toward the receiving chamber 613.

The tray 70 is slidably assembled to the bracket 60 and received within the receiving chamber 613. In the illustrated embodiment, the tray 70 includes a support portion 71, a draw-off portion 73 formed on one end of the supporting portion 71, and a resisting block 75. The supporting portion 71 defines a substantially rectangular recession 711 in a top surface thereof, for receiving the chip card, and further defines two block slots 713 oppositely recessed from two opposite sides of the supporting portion 71, corresponding to the two elastic protrusions 651. Two guiding bars 715 are oppositely formed on two sides of the supporting portion 71 for slidably engaging into the corresponding two guiding slots 6351 of the bracket 60. The draw-off portion 73 is bar-shaped and has a dimension substantially the same as that of the card insert slot 133. As the supporting portion 71 of the tray 70 is totally received within the receiving chamber 613 of the bracket 60, the draw-off portion 73 is also received within the card insert slot 133. The resisting block 75 is a block substantially in the shape of a wedge formed on a middle portion of the draw-off portion 73 and facing toward the opposite other end of the supporting portion 71. The resisting block 75 has an inclined resisting surface 751 facing toward one side of the supporting portion 71.

Figure 2:
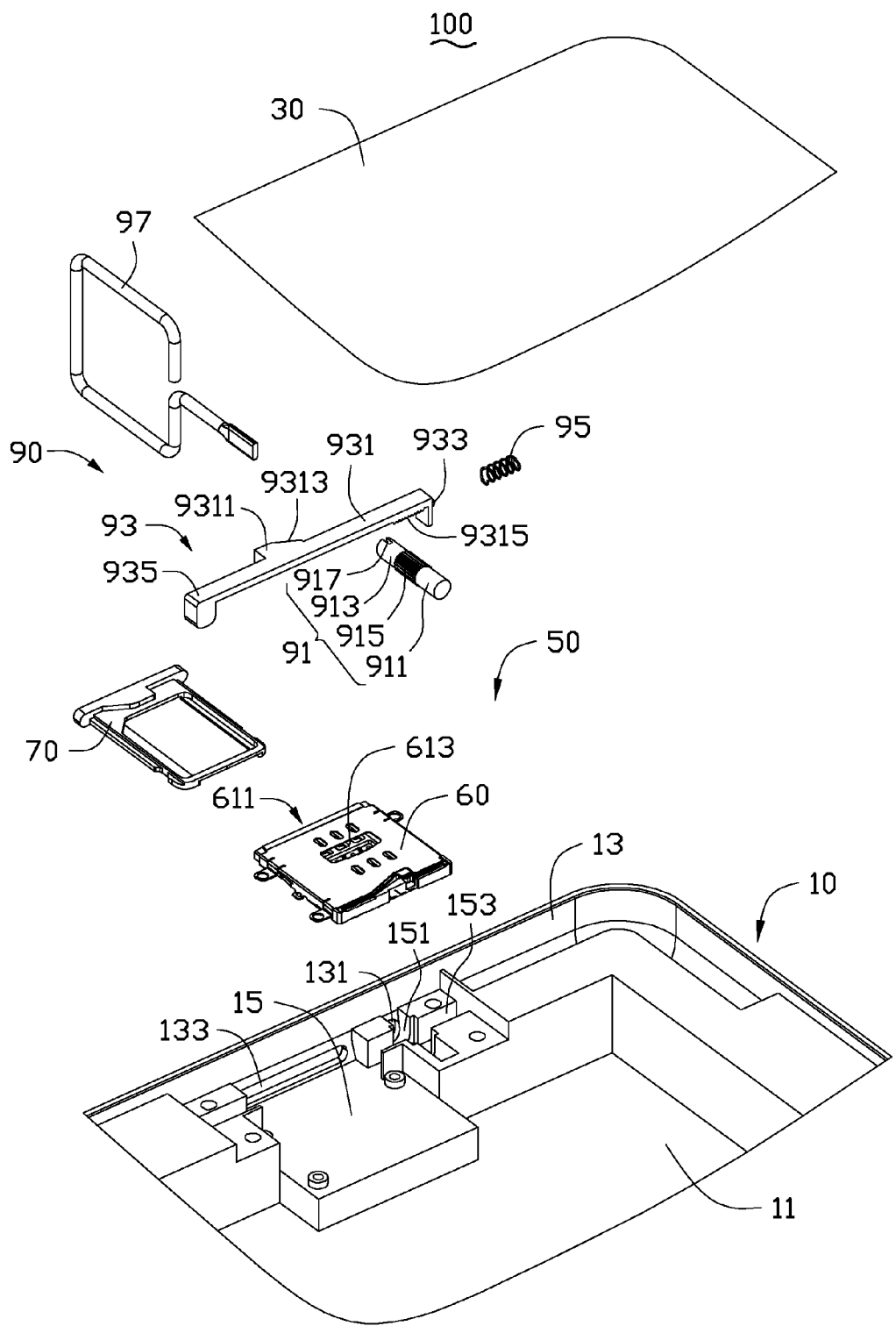
FIG. 2 shows an exploded, isometric view of the electronic device of FIG. 1, wherein the electronic device includes a housing, a display and a chip card holding mechanism.

Also referring to FIG. 2, the unlock assembly 90 is mounted on the mounting base 15 and positioned between the bracket 60 and the side wall of the peripheral wall 13 of the housing 10, and slidably resists against the tray 70. The unlock assembly 90 includes a rotating member 91, an ejecting member 93, an elastic piece 95, and an unlock member 97. The rotating member 91 is rotatably assembled into the mounting slot 151 with one end thereof aimed at the unlock hole 131. The ejecting member 93 is slidably assembled into the sliding slot 153 via the elastic piece 95. One end of the ejecting member 93 engages with the rotating member 91. The unlock member 97 is an included accessory of the electronic device 100 and is capable of passing through the unlock hole 131 of the housing 10 for driving the ejecting member 93 to slide with the sliding slot 153, and thereby to unlock the tray 70 from the bracket 60.

In one embodiment, the rotating member 91 is substantially cylindrical and includes a rotating shaft 911 and an unlock portion 913 disposed at one end of the rotating shaft 911. The rotating shaft 911 includes a cylindrical externally-splined portion (a gear portion 915) formed on a substantially middle portion of the rotating shaft 911. An unlock slot 917 is defined in a distal end surface of the unlock portion 913 and positioned adjacent to the unlock hole 131.

The ejecting member 93 includes an ejecting base body 931, a pushing end 933 formed on one end of the ejecting base body 931, and an opposite resisting end 935 formed at the opposing other end of the ejecting base body 931. A wedge-shaped ejecting block 9311 is formed on a substantially middle portion of one side of the ejecting base body 931, for engaging with the resisting block 75 of the tray 70. The ejecting block 9311 includes an inclined ejecting surface 9313 facing toward the pushing end 933, and the inclined ejecting surface 9313 is configured for slidably resisting against the inclined resisting surface 751 of the tray 70. A plurality of internal splines (a plurality of gear teeth 9315 that are bar-shaped) are separately formed on a bottom surface of the ejecting base body 931, and positioned adjacent to the pushing end 933 for engaging with the gear portion 915 of the rotating member 91.

The elastic piece 95 is assembled within the sliding slot 153 and elastically resists the pushing end 933 of the ejecting member 93.

Figure 5:
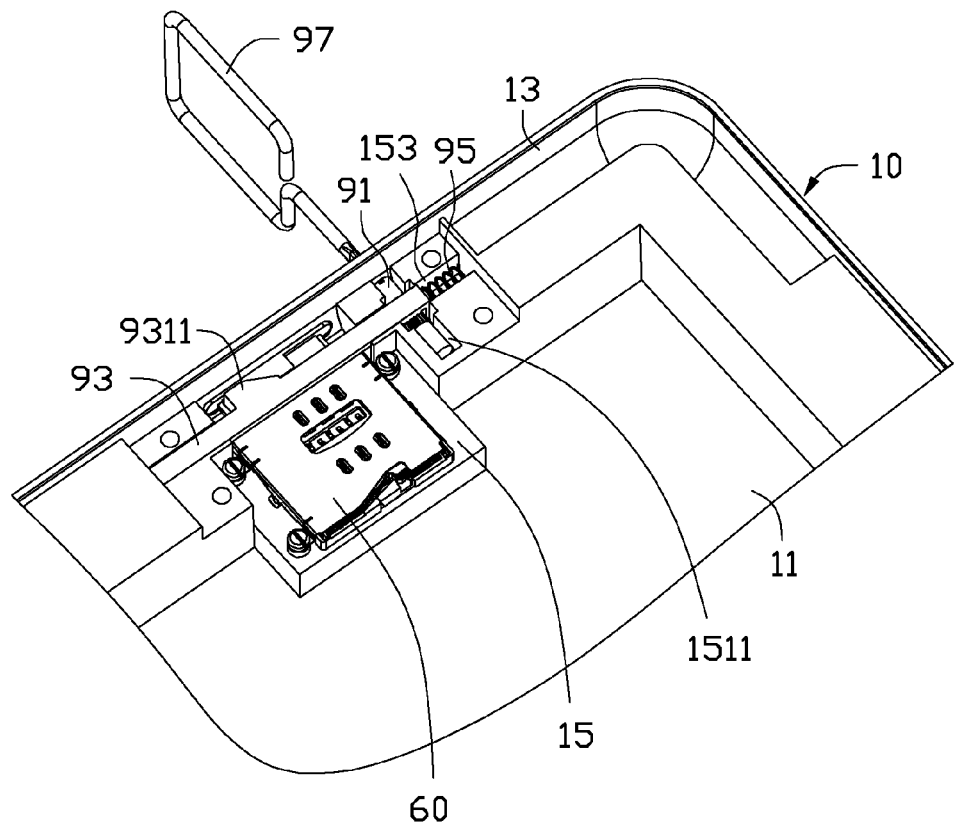
FIG. 5 shows a partial assembled isometric view of the electronic device of FIG. 2.
Figure 6:
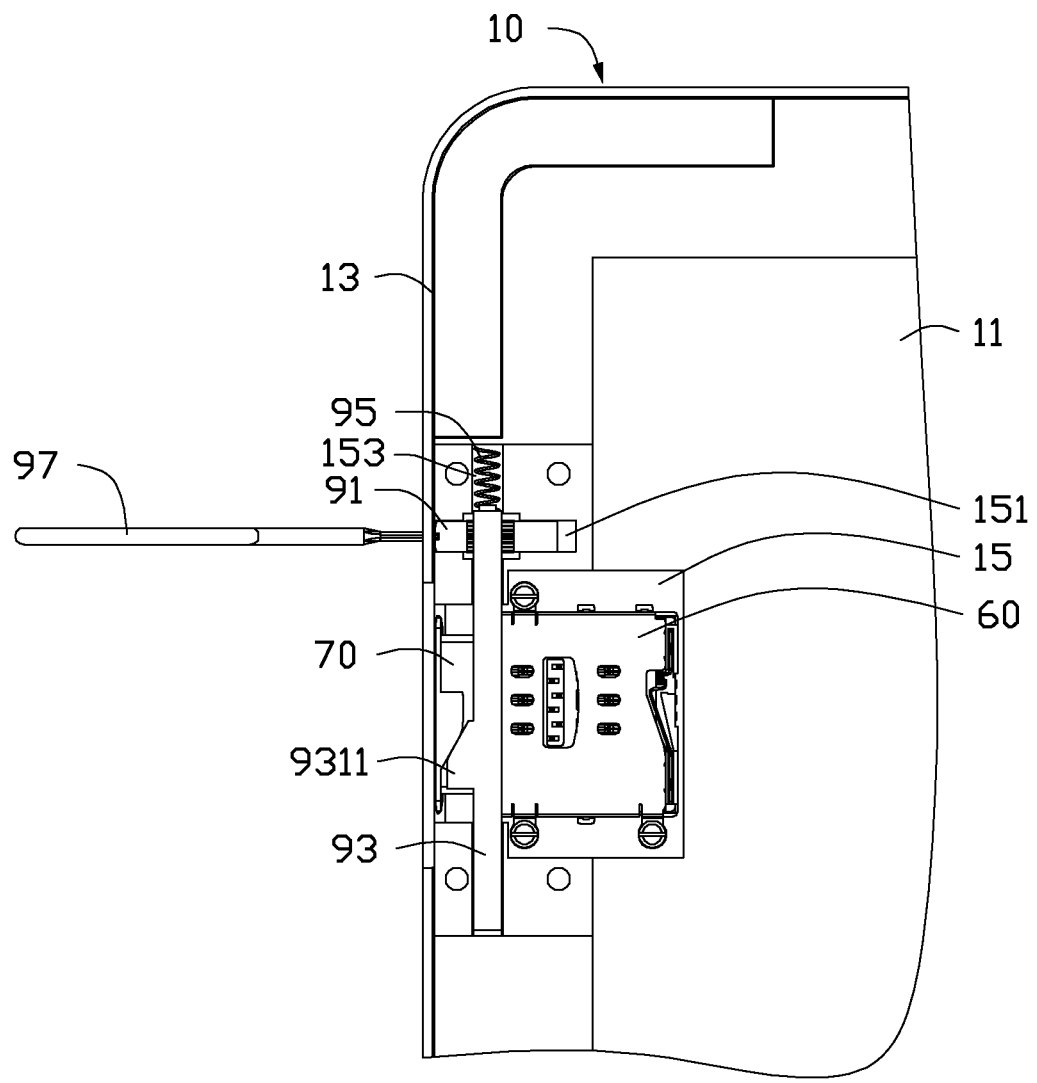
FIG. 6 is similar to FIG. 5, but viewed from another aspect.

Also referring to FIGS. 5 and 6, when assembling the chip card holding mechanism 50, the bracket 60 is firstly mounted on the mounting base 15 of the housing 10. The opening 611 of the bracket 60 points towards and aligns with the card insert slot 133 of the housing 10. The tray 70 is slidably assembled into the receiving chamber 613 of the bracket 60 by passing through the card insert slot 133 and the opening 611. The two guiding bars 715 of the tray 70 slidably engage into the two guiding slots 6351 of the bracket 60. The two elastic protrusions 651 of the two elastic member 65 latch into the two block slots 713 of the tray 70. The rotating member 91 is rotatably assembled into the mounting slot 151 and coaxially aligned with the unlock hole 131 of the housing 10. The ejecting member 93 is assembled into the sliding slot 153 together with the elastic piece 95, and engages with the rotating member 91.

Figure 7:
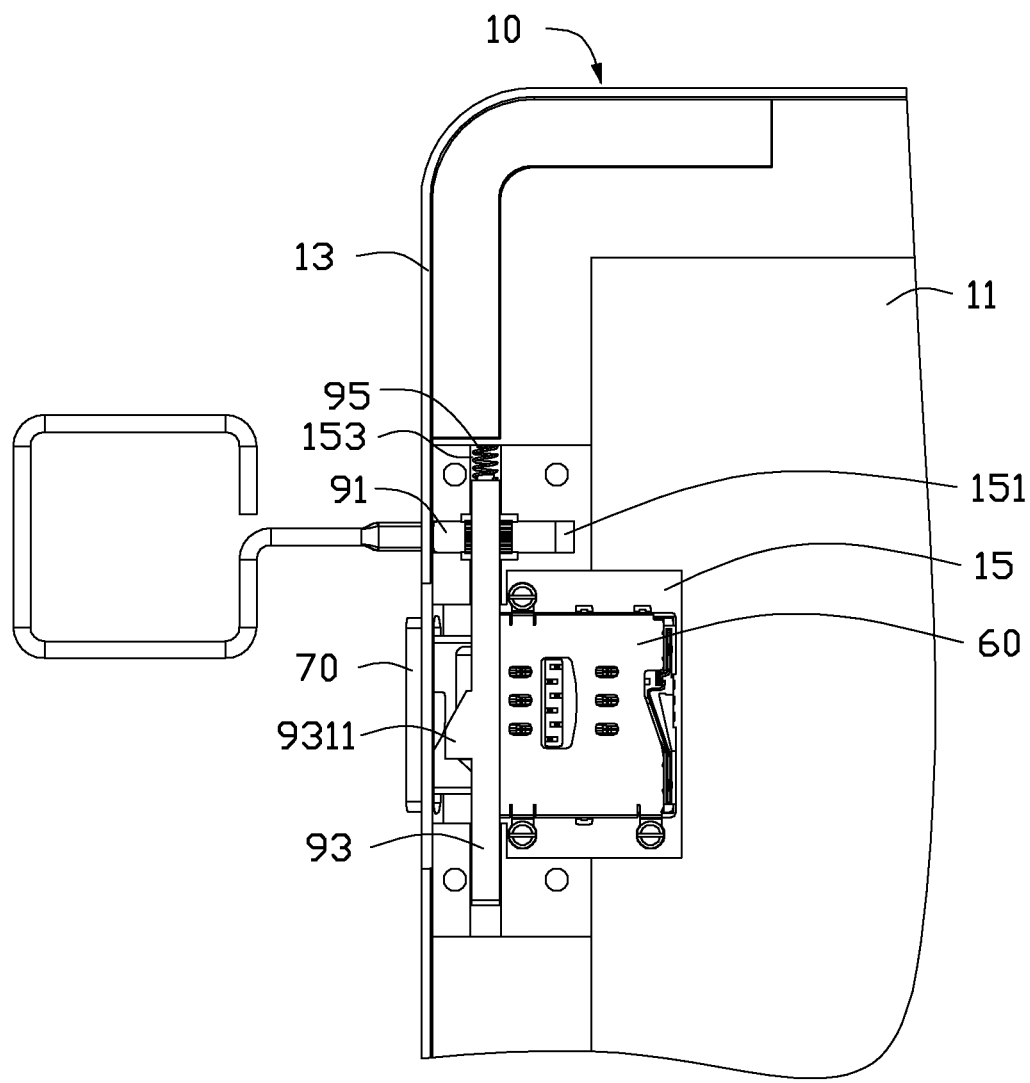
FIG. 7 is similar to FIG. 6, but viewed from another state of use.

Also referring to FIG. 7, in use, one end of the unlock member 97 is inserted into unlock hole 131 of the housing and engages with the unlock slot 917 thereby enabling the rotation of the rotating member 91. The ejecting member 93 is driven by the rotating member 91 to slide within the sliding slot 153 as the inclined ejecting surface 9313 of the ejecting block 9311 is driven to slidably resist the inclined resisting surface 751 of the tray 70, thereby providing an ejecting force to unlock the tray 70. The two elastic protrusions 651 of the two elastic members 65 disengage from the two block slots 713 of the tray 70, and the draw-off portion 73 of the tray 70 is thus exposed from the card insert slot 133 of the housing 10, thereby allowing the user to insert or take out the chip card. Finally, the tray 70 is pushed into and received within the receiving chamber 613 of the bracket 60 to complete the chip card removal or installation operation by using the chip card holding mechanism 50.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A chip card holding mechanism for an electronic device, comprising:
a bracket defining a receiving chamber having an opening;
an unlock assembly assembled adjacent to the opening of the bracket; and
a tray detachably assembled to and received within the receiving chamber of the bracket via the unlock assembly, for receiving a chip card;
wherein, the unlock assembly comprises an ejecting member and an unlock member, the ejecting member is slidably assembled to the opening of the bracket and resists against the tray; the unlock member is an attached accessory for the electronic device for driving the ejecting member to slide away from the opening of the bracket, thereby ejecting the tray;
wherein the tray comprises a support portion, a draw-off portion formed on one end of the support portion, and a wedge-shaped resisting block formed on the draw-off portion; the ejecting member comprises an ejecting base body and a wedge-shaped ejecting block formed on the ejecting base body, and engaging with the corresponding resisting block of the tray;
wherein the supporting portion defines a substantially rectangular recession in a top surface thereof, for receiving the chip card; the resisting block has an inclined resisting surface facing toward one side of the supporting portion; the ejecting block defines an inclined ejecting surface slidably resisting against the corresponding inclined resisting surface of the tray.

2. The chip card holding mechanism of claim 1, wherein the bracket comprises a bottom cover, an upper cover mounted over the bottom cover, and two elastic members, the upper cover and the bottom cover cooperative define the receiving chamber; the two elastic members are oppositely assembled into and positioned at two sides of the receiving chamber; the supporting portion defines two block slots at two opposite sides thereof to engage with the two elastic members.

3. The chip card holding mechanism of claim 2, wherein the bottom cover comprises a main body, a resisting portion formed on one end of the main body, two guiding portions, and two block portions, the two guiding portions are oppositely formed adjacent to two sides of the main body, each guiding portion defines a guiding slot; the main body, the resisting portion, the two guiding portions and the upper cover cooperative define the receiving chamber; the tray further comprises two guiding bars oppositely formed on two sides of the supporting portion and slidably engaging into the corresponding two guiding slots of bottom cover.

4. The chip card holding mechanism of claim 3, wherein the bracket further comprises a bent elastic sheet mounted to the resisting portion and received within the receiving chamber, for elastically resisting against a distal end of the tray.

5. The chip card holding mechanism of claim 3, wherein, the bottom cover further comprises two block portions oppositely formed on two sides of the main body and positioned adjacent to the two guiding portions respectively, each block portion defines a block slot for assembling one elastic member.

6. The chip card holding mechanism of claim 1, wherein the unlock assembly further comprises a rotating member rotatably assembled with the ejecting member thereby driving the ejecting member to slide.

7. The chip card holding mechanism of claim 6, wherein, the rotating member comprises a rotating shaft and an unlock portion disposed at one end of the rotating shaft, the rotating shaft forms a cylindrical gear portion on a substantially middle portion thereof; the ejecting base body comprises a plurality of bar-shaped gear teeth separately formed on a bottom surface thereof to engage with the corresponding gear portion of the rotating member.

8. The chip card holding mechanism of claim 7, wherein the unlock portion defines an unlock slot in a distal end surface thereof.

9. An electronic device, comprising
a housing comprising a base wall and a rectangular peripheral wall, the peripheral wall defining an unlock hole and a card insert slot adjacent to the unlock hole; and a chip card holding mechanism assembled within the housing and positioned adjacent to the card insert slot, for holding a chip card, the chip card holding mechanism, comprising:
a bracket mounted on the base wall of the housing and defining a receiving chamber having an opening aligning with the card insert slot of the housing;
an unlock assembly assembled adjacent to the opening of the bracket and the peripheral wall of the housing; and
a tray detachably assembled to and received within the receiving chamber of the bracket via the unlock assembly, for receiving a chip card;
wherein, the unlock assembly comprises an ejecting member and an unlock member, the ejecting member is slidably assembled within the housing and positioned adjacent to the opening of the bracket to resist against the tray; the unlock member is an attached accessory of the electronic device for driving the ejecting member to slide away from the opening of the bracket, thereby ejecting the tray from the opening and the card insert slot;
wherein, the tray comprises a support portion, a draw-off portion formed on one end of the support portion, and a wedge-shaped resisting block formed on the draw-off portion; the ejecting member comprises an ejecting base body and a wedge-shaped ejecting block formed on the ejecting base body, and engaging with the corresponding resisting block of the tray;
wherein, the supporting portion defines a substantially rectangular recession in a top surface thereof, for receiving the chip card; the resisting block has an inclined resisting surface facing toward one side of the supporting portion; the ejecting block defines an inclined ejecting surface slidably resisting against the corresponding inclined resisting surface of the tray.

10. The electronic device of claim 9, wherein the housing further comprises a mounting base formed on the base wall and positioned adjacent to the unlock hole and the card insert slot, the mounting base defines a sliding slot adjacent to the card insert slot; the bracket is fixedly mounted on the mounting base, the ejecting member is slidably assembled into the sliding slot via an elastic piece, and positioned between the card insert slot and the bracket.

11. The electronic device of claim 10, wherein the mounting base further defines a mounting slot perpendicularly intersecting with the sliding slot and coaxially communicating with the unlock hole of the housing; the unlock assembly further comprises a rotating member assembled in the mounting slot and rotatably engages with the ejecting member thereby driving the ejecting member to slide within the sliding slot.

12. The electronic device of claim 11, wherein the rotating member comprises a rotating shaft and an unlock portion disposed at one end of the rotating shaft, the rotating shaft forms a cylindrical gear portion on a substantially middle portion thereof; the ejecting base body comprises a plurality of bar-shaped gear teeth separately formed on a bottom surface thereof to engage with the corresponding gear portion of the rotating member.

13. The electronic device of claim 10, wherein, the bracket comprises a bottom cover, an upper cover mounted over the bottom cover, and two elastic members, the upper cover and the bottom cover cooperative define the receiving chamber; the two elastic members are oppositely assembled into and positioned at two sides of the receiving chamber; the supporting portion defines two block slots at two opposite sides thereof to engage with the two elastic members.

14. The electronic device of claim 13, wherein the bottom cover comprises a main body, a resisting portion formed on one end of the main body, two guiding portions, and two block portions, the two guiding portions are oppositely formed adjacent to two sides of the main body, each guiding portion defines a guiding slot; the main body, the resisting portion, the two guiding portions and the upper cover cooperative define the receiving chamber; the tray further comprises two guiding bars oppositely formed on two sides of the supporting portion and slidably engaging into the corresponding two guiding slots of bottom cover.

* * * * *